Sept. 19, 1961 G. MADELUNG 3,000,594
TILTABLE JET POWER UNIT FOR AIRCRAFT
Filed Oct. 31, 1960
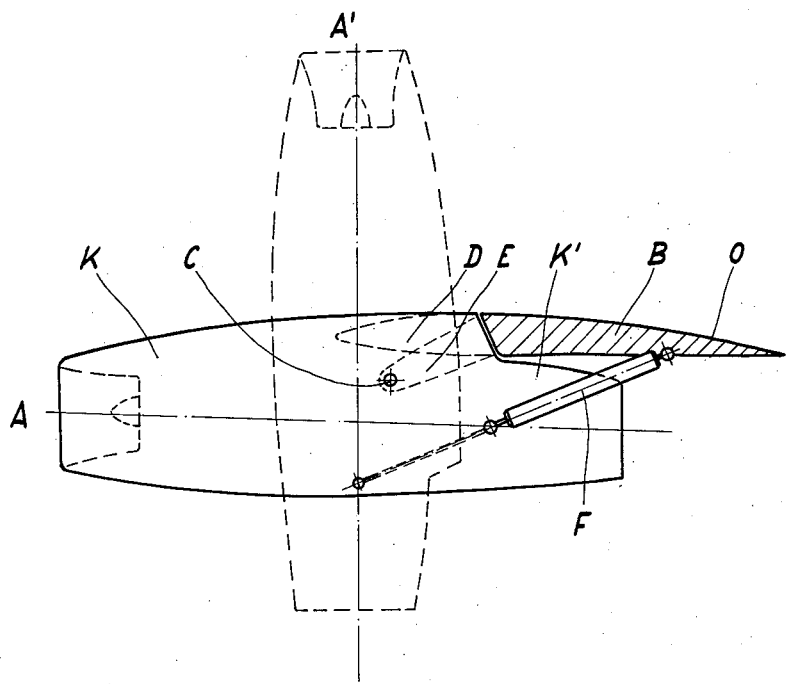
G. MADELUNG
INVENTOR.
BY
ATTORNEYS.

United States Patent Office 3,000,594
Patented Sept. 19, 1961

3,000,594
TILTABLE JET POWER UNIT FOR AIRCRAFT
Gero Madelung, Munich, Germany, assignor to Messerschmitt A.G., Augsburg, Germany, a company of Germany
Filed Oct. 31, 1960, Ser. No. 66,260
Claims priority, application Germany Oct. 30, 1959
1 Claim. (Cl. 244—12)

This invention relates to improved means for suspending a jet power unit or units tiltably under the wing or control surface of an aircraft.

The figure on the drawing shows an elevational sectional view.

The invention is illustrated by way of example on the accompanying drawing which shows a jet power unit tiltably suspended under a wing or control surface B of an aircraft. The jet power unit A is arranged to tilt on a pivot C. This pivot C is mounted between fittings E in the form of arms projecting forwardly from under the wing or control surface B. Moreover, the pivot C is located not only under the plane of the wing or control surface B but also in front of the point of maximum thickness of the profile of the wing or control surface B. It is approximately parallel to the transverse axis of the aircraft.

That portion of the wing, namely the leading edge of B, into which the jet power unit A will swing when it is tilted into the vertical A' is suitably recessed. Moreover, the contours K of the jet power unit A are so contrived that when the jet power unit is in the horizontal position A the said recess D in the wing or control surface B will be occupied by the cowling of the jet power unit in an aerodynamically acceptable manner, that is to say in such a way that the contour K will form an aerodynamic continuation of surface O of the wing or control surface B in the forward direction.

To this end the external contour K' of the jet power unit A is recessed in relation to contour K by an amount approximately equal to the thickness of the wing profile.

Although the drawing shows only one jet power unit, it will be understood that a plurality or group of power units may be suspended from the aircraft.

The means for tilting the jet power unit A may consist of an hydraulic or pneumatic cylinder or a screw spindle F, said means being preferably located on one side of the power unit or between the power units (particularly when the latter are comprised in a group).

The term airfoil member as used in the claim is meant to be generic to wings and control surfaces on aircraft.

I claim:

Means for suspending at least one jet power unit tiltably below an airfoil member of an aircraft, comprising a pivot located below said airfoil member of the aircraft in front of the point of maximum thickness of the airfoil member profile and extending substantially parallel to the transverse axis of the aircraft, said pivot being supported by the airfoil member, the region of the airfoil member above said pivot being recessed to permit the jet power unit to swing into said recess when deflected into the vertical position, the cowling of the jet power unit being constructed so that the said recess will be occupied by the cowling when the jet power unit is in the horizontal position, the upper contour of the jet power unit having a rear portion which is recessed in relation to the forward portion by an amount substantially equal to the thickness of the airfoil member, tilting means being provided for tilting the jet power unit.

References Cited in the file of this patent

FOREIGN PATENTS 1,053,322   Germany _____ Mar. 19, 1959